(12) United States Patent
Paquet

(10) Patent No.: US 9,028,325 B2
(45) Date of Patent: *May 12, 2015

(54) NUMBER OF PLAYERS DETERMINED USING FACIAL RECOGNITION

(71) Applicant: Disney Enterprises, Inc., Burbank, CA (US)

(72) Inventor: Philippe Paquet, Beverly Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,842

(22) Filed: Dec. 3, 2013

(65) Prior Publication Data

US 2014/0087876 A1    Mar. 27, 2014

Related U.S. Application Data

(63) Continuation of application No. 12/932,381, filed on Feb. 23, 2011, now Pat. No. 8,672,754.

(51) Int. Cl.
*A63F 9/24*       (2006.01)
*A63F 13/00*      (2014.01)
*G06F 17/00*      (2006.01)
*G06F 19/00*      (2011.01)
*A63F 13/40*      (2014.01)
*G06F 3/01*       (2006.01)
*G06F 3/03*       (2006.01)

(52) U.S. Cl.
CPC ............... *A63F 13/00* (2013.01); *A63F 13/10* (2013.01); *A63F 2300/695* (2013.01); *A63F 2300/8088* (2013.01); *G06F 3/012* (2013.01); *G06F 3/0304* (2013.01)

(58) Field of Classification Search
CPC ...... G07F 17/32; G07F 17/3225; A63F 13/00
USPC .............. 463/20, 25, 29, 30, 40, 42; 273/292; 725/24

See application file for complete search history.

*Primary Examiner* — Adetokunbo O Torimiro
(74) *Attorney, Agent, or Firm* — Farjami & Farjami LLP

(57) ABSTRACT

There is provided a system and method for determining a number of players present using facial recognition. There is provided a method comprising capturing an image of the players present, and determining the number of players present based on the image. In this manner, players may more easily configure game settings, whereas spectators may be presented a more engaging experience.

20 Claims, 3 Drawing Sheets

NUMBER OF PLAYERS DETERMINED USING FACIAL RECOGNITION

This application is a Continuation of U.S. patent application Ser. No. 12/932,381, filed Feb. 23, 2011.

BACKGROUND OF THE INVENTION

1. Field of the Invention

The present invention relates generally to facial recognition or perception. More particularly, the present invention relates to using facial recognition to count a number of players playing a video game.

2. Background Art

Video game consoles and other computers and devices are capable of presenting interactive video games for players to play. Video games allow for multiple players to play the same game together. The devices are often configured with multiple controllers, one for each player. However, the players must manually configure or modify the game in order to play the game with the desired number of players. Games often present options or settings to the players. The players select the number of players playing the game using such options or settings. If the number of players changes, the game must be reconfigured by one of the players.

Not all of the people present with the device may be able to play the game together. The game may be designed for only a specific number of players. For example, platform games are often designed for a single player at a time. The game device may be limited in the number of simultaneous players. For example, many video game consoles support only up to 4 players at once in the same room. Although the device may support multiple players, the number of actual players may be further limited by the number of controllers available. Other game consoles, particularly hand-held devices, are often designed for a single local player. Moreover, people may also choose to be spectators and not play the game.

Video game consoles and modern computers have become increasingly sophisticated. Many such devices have attached cameras, or are configured to accept camera attachments. The games themselves often have access to the camera and its functions. The camera may be capable of capturing an image of the room that houses the game device. As such, the camera can capture the players present in the room. Although the device may have access to this image, in conventional implementations the players must manually configure the game for the correct number of players.

Accordingly, there is a need to overcome the drawbacks and deficiencies in the art by providing a solution enabling the game device to determine the number of players for a video game without requiring manual intervention from the players.

SUMMARY OF THE INVENTION

There are provided systems and methods for determining a number of players present using facial recognition, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for determining a number of players present using facial recognition. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
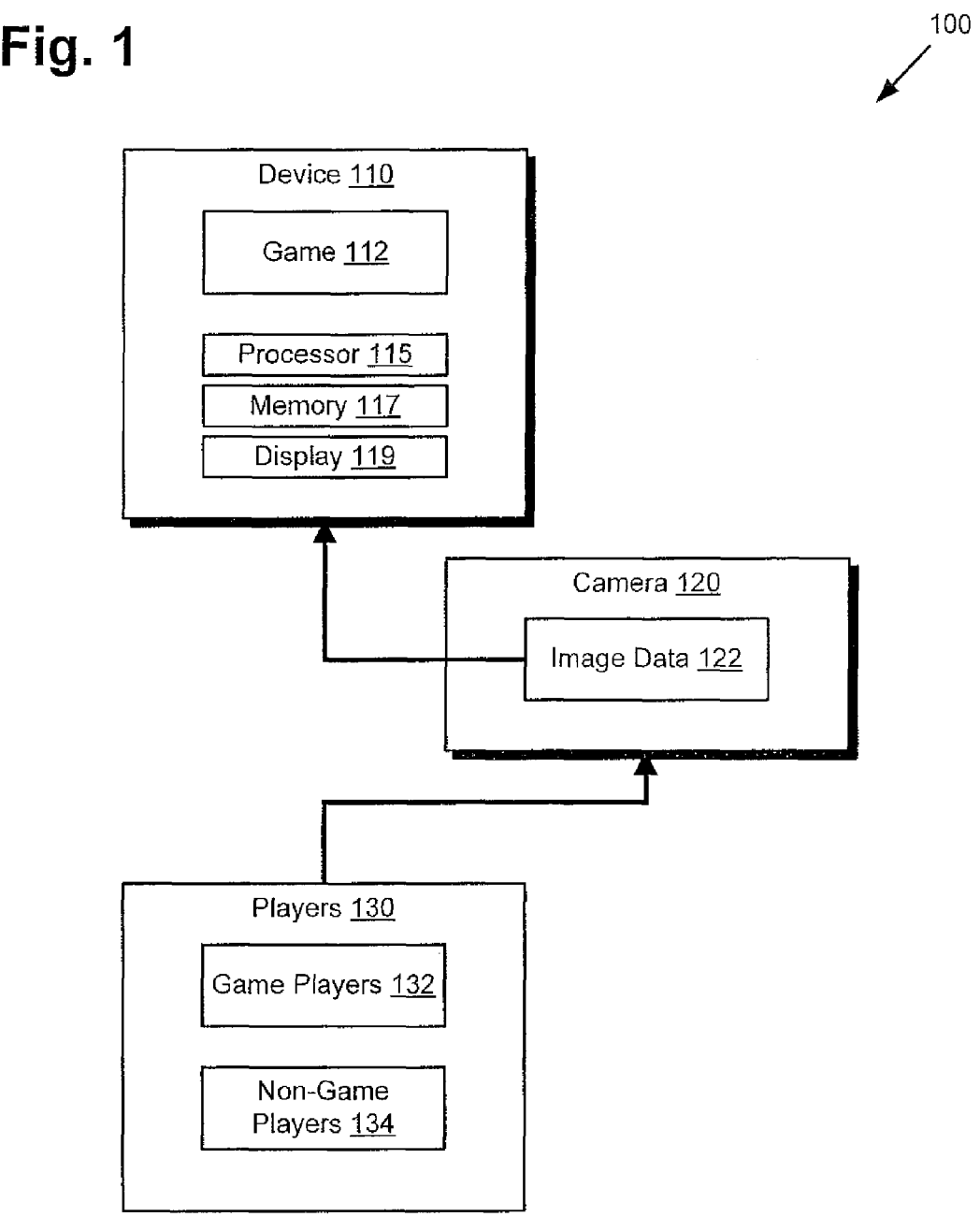
FIG. 1 presents a system for determining a number of players present using facial recognition, according to one embodiment of the present invention.

FIG. 1 presents a system for determining a number of players present using facial recognition, according to one embodiment of the present invention. Environment 100 of FIG. 1 includes device 110, camera 120, and players 130. Device 110 includes game 112, processor 115, memory 117, and display 119. Camera 120 includes image data 122. Players 130 include game players 132 and non-game players 134.

In one embodiment, device 110 may comprise any computing machine capable of presenting game 112, as well as accept connections from other devices, such as a camera. For example, device 110 may comprise a Playstation 3™ console, an Xbox 360™ console, or a personal computer. These devices are often located in a room in a house, such as a living room. Alternatively, device 110 may comprise a hand-held computing device, such as a Nintendo DS™ or an Apple iPhone™. Display 119 may comprise any display capable of displaying output from device 110. Display 119 may be integrated with device 110, such as the screen of an iPhone. In alternative embodiments, display 119 may comprise a separate component, externally connected to device 110, such as a television. Processor 115 may comprise a processor capable of performing the tasks of device 110 described below. Memory 117, which may be controlled by processor 115, may comprise an area of memory, such as RAM, where software instructions and algorithms may reside. For example, game 112 may reside in memory 117. Game 112 may comprise any interactive video based experience, such as a video game. Game 112 may present video shown on display 119 which a user or player may interact with through device 110, often with specific objectives. Although in many embodiments game 112 may comprise a video game, the present invention is not limited to entertainment applications. For example, game 112 may instead comprise a vehicle simulation.

Camera 120 may comprise any camera or image capture device capable of connecting to device 110. For example, the Playstation Eye™ may connect to a Playstation 3, whereas the Microsoft Kinect may connect to an Xbox 360 and a webcam may connect to a personal computer. Camera 120 is preferably located in the same room as device 110, situated to capture all the people present in the room. However, camera 120 may be in another location than device 110, particularly if some of players 130 are located elsewhere. Although not shown in FIG. 1, camera 120 and device 110 may comprise a single integrated device. For example, the iPhone 4 has two built-in cameras. Camera 120 includes image data 122. Image data 122 may comprise images captured by camera 120. Image data 122 may be stored as a file or files on camera 120 and/or device 110, or may alternatively comprise temporary data. In addition, image data 122 may comprise more than one image, or may comprise video data. Image data 122 may provide the raw data that may be used for facial recognition, a technique known in the art. Accordingly, camera 120 and image data 122 are not limited to capturing only visual light. For example, camera 120 may comprise an infrared sensor, and image data 122 may comprise thermal image data captured by camera 120. The captured thermal image data may be used in facial recognition.

Players 130 may comprise the persons present in the room with device 110 and camera 120. However, players 130 may comprise persons not present in the room, but able to view and/or interact with game 112, and detectable by camera 120. Players 130 include game players 132 and non-game players 134. Game players 132 may comprise the persons present who are actively playing game 112 on device 110 when camera 120 captures image data 122. For example, game players 132 may comprise persons using controllers to play game 112 on device 110. Non-game players 134 may comprise persons present but not part of game players 132. In the preceding example, everyone else present with game players 132 may comprise non-game players 134. Non-game players 134 are not limited to persons who are waiting to play or have just completed a game. Non-game players 134 may comprise spectators who are present, or other persons who are present but not otherwise engaged in game 112.

Before device 110 starts a video game, camera 120 may, at the request of device 110, capture image data 122 of players 130 present in the room. Camera 120 may then send or otherwise make available image data 122 for analysis by device 110. Device 110 may use facial recognition or facial perception techniques, which are known in the art, to analyze image data 122. Alternatively, camera 120 may analyze image data 122. Subsequently, device 110 may count the number of faces in image data 122, which corresponds to the number of persons in players 130. Device 110 may then make the number of players available to game 112 without the need for game 112 to ask one of players 130 for the number of players. Game 112 may then be modified according to the new number of players.

Figure 2A:
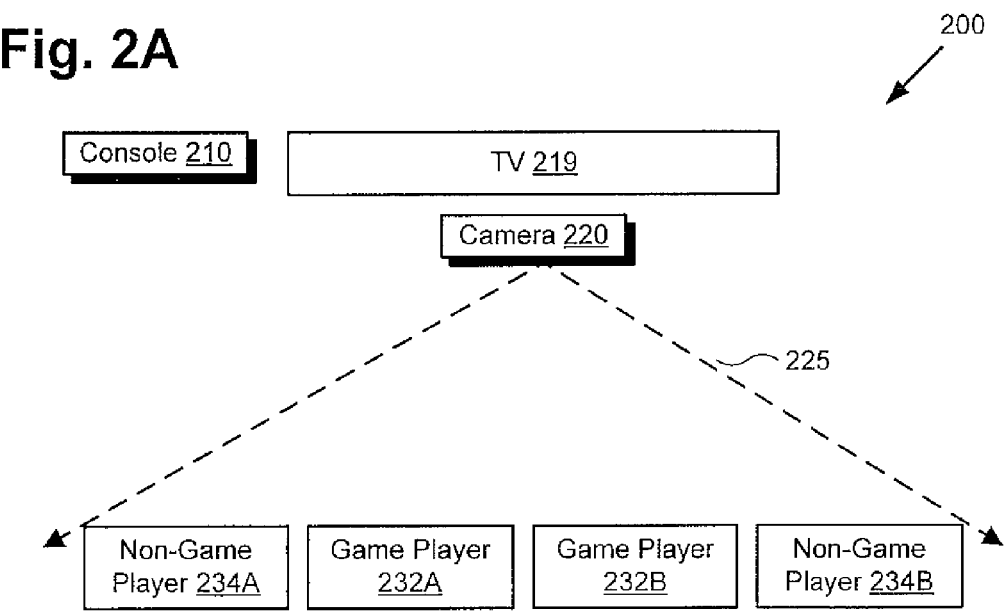
FIGS. 2A and 2B present, respectively, a top-down view and side view of an exemplary environment for determining a number of players present using facial recognition, according to one embodiment of the present invention.
Figure 2B:
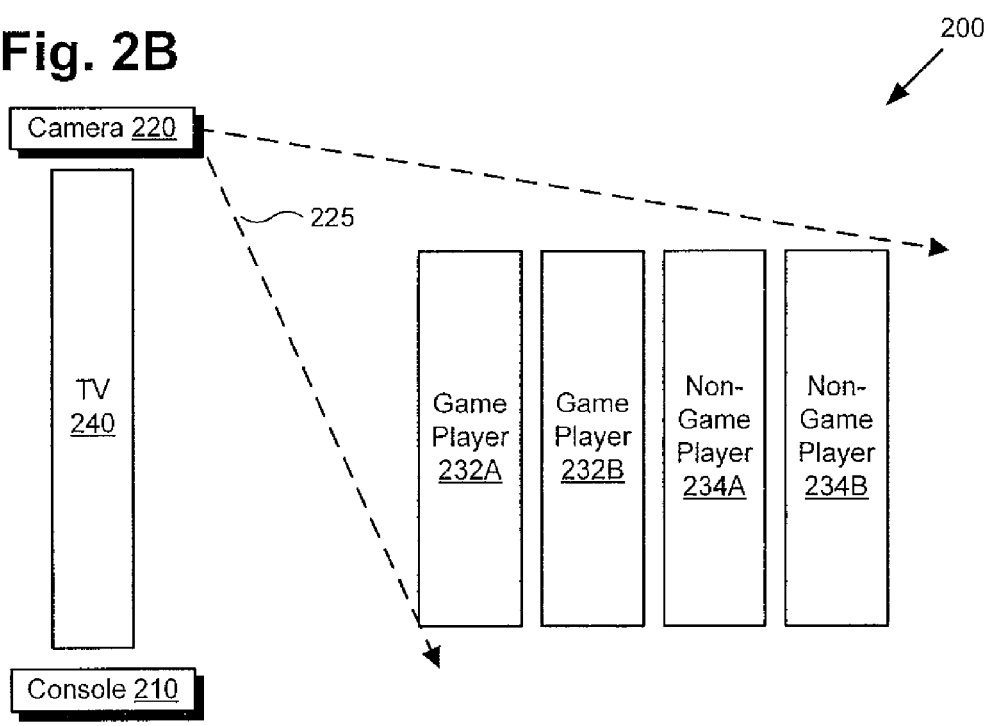

Moving to FIGS. 2A and 2B, FIG. 2A shows a top-down view of an exemplary environment for determining a number of players present using facial recognition, according to one embodiment of the present invention. FIG. 2B shows a side view of the exemplary environment of FIG. 2A. FIGS. 2A and 2B include the same elements. Environment 200 includes console 210, TV 219, camera 220, view 225, game player 232A and 232B, and non-game player 234A and 234B.

Environment 200 may comprise a living room in a typical house. Console 210, which may correspond to device 110 of FIG. 1, may comprise a video game console. Although not depicted in FIGS. 2A and 2B, console 210 may be connected to TV 219 and camera 220. Console 210 may be capable of presenting video games, such as game 112 in FIG. 1, through TV 219, which may correspond to display 119 in FIG. 1. TV 219 may comprise a television set. Camera 220, which may correspond to camera 120 in FIG. 1, may comprise a camera peripheral that may connect to console 210. View 225 corresponds to the range of vision of camera 220. Game player 232A and 232B, which may correspond to game players 132 in FIG. 1, may comprise persons in environment 200 who are currently playing game 112 on console 210. Non-game player 234A and 234B, which may correspond to non-game players 134 in FIG. 1, may comprise persons who are in environment 200 but not currently playing game 112 on console 210. Although depicted as single bodies in FIGS. 2A and 2B, each of game player 232A and 232B and non-game player 234A and 234B may comprise one or more persons.

As depicted in FIG. 2A, TV 219 may be centrally located in environment 200 to provide a good viewing angle for game player 232A and 232B and non-game player 234A and 234B. Console 210 may be located near TV 219, for example beside TV 219, in order to be connected to TV 219. In this embodiment, camera 220 may be located on top of TV 219, as depicted in FIG. 2B, so that view 225 may capture game player 232A and 232B and non-game player 234A and 234B. Although in FIGS. 2A and 2B game player 232A and 232B and non-game player 234A and 234B are situated in a line, they may alternatively be situated elsewhere within view 225. Once camera 220 captures an image of environment 200, console 210 may determine a number of players present, a process described in further detail below with respect to FIG. 3. Console 210 may be able to distinguish between game player 232A and 232B from non-game player 234A and 234B, for example, by recognizing that game player 232A and 232B hold controllers to console 210 whereas non-game player 234A and 234B do not. Alternatively, console 210 may not be able to make a specific identification, but determine generally the number of players playing the game and the number of players not playing the game. For instance, console 210 may be aware of the number of players currently playing, based on the settings of game 112. If the number of persons detected exceeds the number of players currently playing, the excess number may represent players not playing the game.

Figure 3:
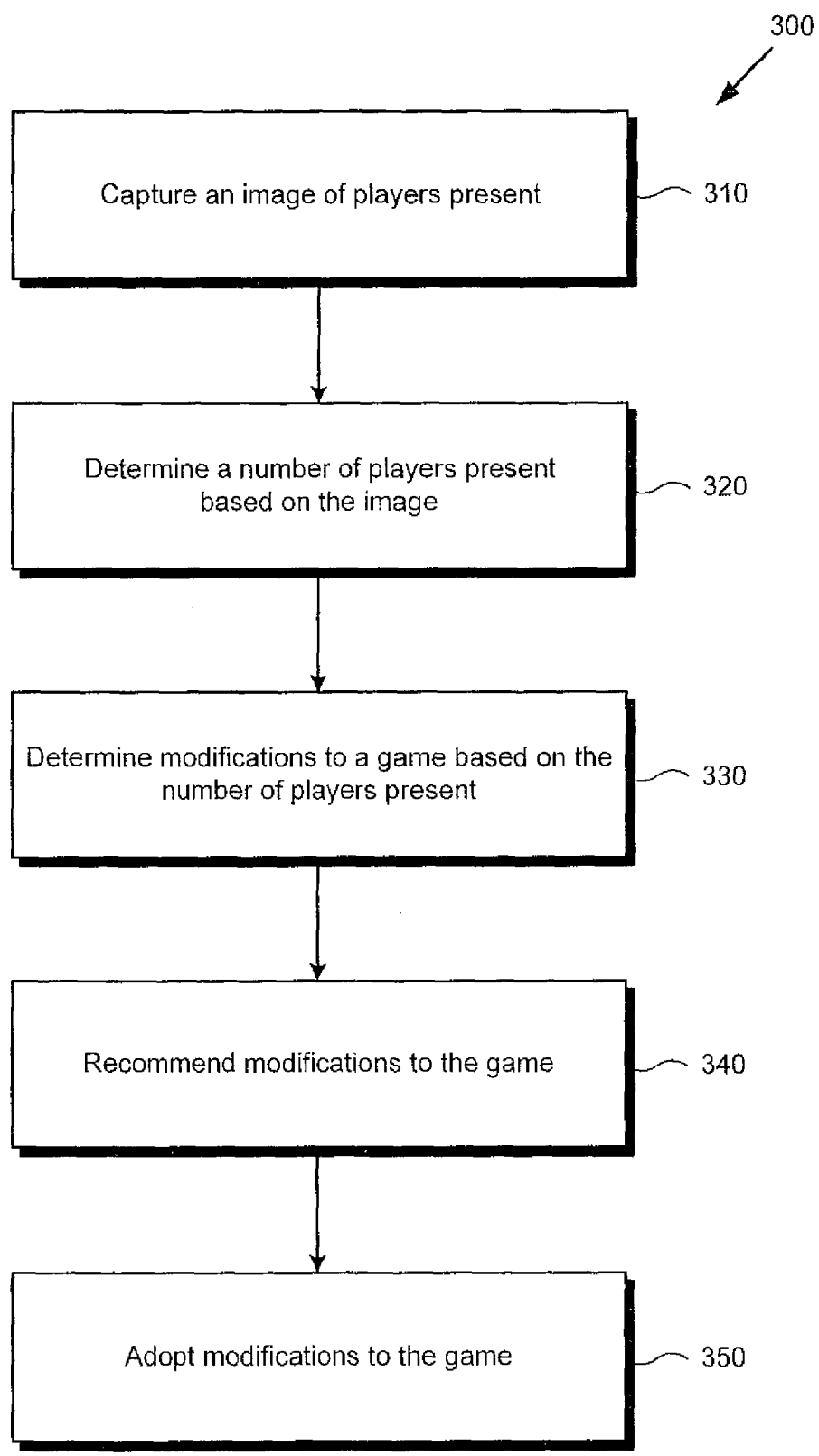
FIG. 3 shows a flowchart describing the steps, according to one embodiment of the present invention, by which a number of players present may be determined using facial recognition.

Moving to FIG. 3, FIG. 3 shows a flowchart describing the steps, according to one embodiment of the present invention, by which a number of players present may be determined using facial recognition. Certain details and features have been left out of flowchart 300 that are apparent to a person of ordinary skill in the art. For example, a step may comprise one or more substeps or may involve specialized equipment or materials, as known in the art. While steps 310 to 350 indicated in flowchart 300 are sufficient to describe one embodiment of the present invention, other embodiments of the invention may utilize steps different from those shown in flowchart 300.

Referring to step 310 of flowchart 300 in FIG. 3 and environment 100 of FIG. 1, step 310 of flowchart 300 comprises camera 120 capturing image data 122 of players 130 present with device 110. Processor 115, through device 110, may request camera 120 to capture image data 122 before players 130 start playing game 112 on device 110. Possible times include but are not limited to the following: during a loading screen; during a demo screen; while a startup screen is displayed; or when a menu screen is displayed. Alternatively, camera 120 may capture image data 122 during actual gameplay. For example, camera 120 may capture image data 122 as part of its normal function within game 112, or during downtime or loading screens during gameplay. Preferably, the time between capturing image data 122 and actual gameplay should be minimized, in order to obtain the most recent and accurate image of players 130. In addition, camera 120 preferably captures a clear view of all faces of players 130.

Referring to step 320 of flowchart 300 in FIG. 3 and environment 100 of FIG. 1, step 320 of flowchart 300 comprises determining a number of players present based on image data 122. Device 110 may analyze image data 122 using facial recognition or facial perception techniques known in the art. By recognizing what parts of image data 122 correspond to the faces of players 130, device 110 may be able to count the faces to determine a number of players present. Alternatively, camera 120 may conduct parts or all of the analysis on image data 122. Device 110 may make this number of players present available to game 112. Game 112 may have previously prompted one of players 130 for the number of players present, or alternatively game 112 may rely solely on device 110 to determine the number of players present. As previously discussed, device 110 may be able to distinguish between game players 130 and non-game players 132, for example by identifying persons holding controllers. Alternatively, device 110 may determine the number of non-game players 132 based on the difference between the total number of players present and the number of players currently playing game 112.

Referring to step 330 of flowchart 300 in FIG. 3 and environment 100 of FIG. 1, step 330 of flowchart 300 comprises determining modifications to game 112 based on the number of players present. For example, a possible modification may be to correct the number of active players game 112 expects. However, more complicated modifications may be available.

The modifications may alter the gameplay for game players 132. A possible modification may change the length of gameplay. For instance, if game players 132 must take turns with non-game players 134 to play game 112, shortening the gameplay would allow more persons to play in the same amount of time.

The modifications may also appeal to non-game players 134. The modifications may provide audience participation for non-game players 134. A possible modification may involve adding interesting background events and images for non-game players 134 to view. Such background images may further be based on image data 122, for example using the faces of one of non-game players 134. A more elaborate modification may involve establishing a secondary game in the background. The secondary game may provide non-game players 134 with objectives, such as counting stars in the background, which do not interfere with the main gameplay. Other possible modifications may provide incentives for non-game players 134 to join game 112. For example, if game players 132 are performing poorly within game 112, a possible modification may present a bonus for non-game players 134 to interrupt the poor performance of game players 132.

Referring to step 340 of flowchart 300 in FIG. 3 and environment 100 of FIG. 1, step 340 of flowchart 300 comprises recommending the modifications to game 112. Game 112, through device 110, may present players 132 with options to apply the recommended modifications. Game 112 may alternatively ask players 132 to confirm the modifications. For example, game 112 may set up a tournament mode based on the number of players present, and subsequently ask players 132 to confirm the tournament mode. In alternative embodiments, this step may be skipped for some or all modifications.

Referring to step 350 of flowchart 300 in FIG. 3 and environment 100 of FIG. 1, step 350 of flowchart 300 comprises adopting the modifications to game 112. The modifications may have been explicitly accepted in the previous step, such as players 132 accepting a tournament mode based on the number of players present. Game 112 may then adopt the accepted modifications and alter its gameplay accordingly. In the preceding example, game 112 may start a new game based on the tournament mode.

Other modifications may be automatically adopted, particularly if step 340 was skipped. For example, game 112 may automatically adopt interesting background scenery for the spectators in non-game players 134. In another example, game 112 may automatically expect a certain number of players without prompting players 132 for a number.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A device for determining a number of players for a game, the device comprising:
   a camera configured to capture an image and generate an image data from the image;
   a processor configured to:
   analyze the image data;
   determine a total number of people present based on analyzing the image data;
   determine a number of players from the total number of people based on analyzing the image data, the number of players corresponding to a total number of people actively playing the game;
   modify the game based on at least one of the total number of people present and the number of players; and
   present the modified game on a display.

2. The device of claim 1, wherein the device does not ask a player for the number of players present.

3. The device of claim 1, wherein the game is modified without confirmation from a player.

4. The device of claim 1, wherein the device prompts a set of game modifications based on the number of players present.

5. The device of claim 1, wherein a length of the game is modified based on the number of players present.

6. The device of claim 1, wherein the total number of people present exceeds the number of players.

7. The device of claim 6, wherein the device presents an incentive for people present not playing the game to join the game.

8. The device of claim 6, wherein the device presents a background event based on a number of people present not playing the game.

9. The device of claim 6, wherein the device presents a secondary game playable by at least one of the people present not playing the game.

10. The device of claim 6, wherein a background element of the game is based on at least one of the people present not playing the game.

11. A method for determining a number of players present for a game, the method comprising:
    capturing an image using a camera;

generating an image data from the image by the camera;
analyzing, using a processor, the image data;
determining a total number of people present based on the analyzing of the image data;
determining a number of players from the total number of people based on the analyzing of the image data, the number of players corresponding to a total number of people actively playing the game;
modifying the game based on at least one of the total number of people present and the number of players; and
presenting the modified game on a display.

12. The method of claim 11, wherein a player is not asked for the number of players present.

13. The method of claim 11, wherein the game is modified without confirmation from a player.

14. The method of claim 11, wherein a set of game modifications based on the number of players present is prompted.

15. The method of claim 11, wherein a length of the game is modified based on the number of players present.

16. The method of claim 11, wherein the total number of people present exceeds the number of players.

17. The method of claim 16, wherein an incentive for people present not playing the game to join the game is presented.

18. The method of claim 16, wherein a background event based on a number of people present not playing the game is presented.

19. The method of claim 16, wherein a secondary game playable by at least one of the people present not playing the game is presented.

20. The method of claim 16, wherein a background element of the game is based on at least one of the people present not playing the game.

* * * * *

UNITED STATES PATENT AND TRADEMARK OFFICE
CERTIFICATE OF CORRECTION

| | | |
|---|---|---|
| PATENT NO. | : 9,028,325 B2 | Page 1 of 1 |
| APPLICATION NO. | : 14/095842 | |
| DATED | : May 12, 2015 | |
| INVENTOR(S) | : Philippe Paquet | |

It is certified that error appears in the above-identified patent and that said Letters Patent is hereby corrected as shown below:

In the claims,

Column 6, line 35, claim 1, "determine a number" should be changed to --determine the number--

Column 6, line 37, claim 1, "to a total" should be changed to --to the total--

Signed and Sealed this
Eighteenth Day of August, 2015

Michelle K. Lee
*Director of the United States Patent and Trademark Office*